United States Patent [19]
Pettitt et al.

[11] Patent Number: 5,790,205
[45] Date of Patent: Aug. 4, 1998

[54] METHOD OF INCREASE SHARPNESS IN DIGITAL DISPLAYS

[75] Inventors: Gregory S. Pettitt, Rowlett; Todd A. Clatanoff, Allen, both of Tex.

[73] Assignee: Texas Instruments Incorporated, Dallas, Tex.

[21] Appl. No.: 702,345

[22] Filed: Aug. 23, 1996

[51] Int. Cl.$^6$ ...................................... H04N 5/21
[52] U.S. Cl. ...................... 348/629; 348/627; 348/623
[58] Field of Search .................................... 348/607, 623, 348/622, 625, 627, 629; 364/724.11; 382/260; H04N 5/21

[56] References Cited

U.S. PATENT DOCUMENTS

| | | | |
|---|---|---|---|
| 4,941,185 | 7/1990 | Massmann . | |
| 5,161,015 | 11/1992 | Citta | 348/606 |
| 5,262,849 | 11/1993 | Mimura | 348/224 |
| 5,313,301 | 5/1994 | Lee | 348/607 |
| 5,416,532 | 5/1995 | Ko | 348/630 |
| 5,432,563 | 7/1995 | Kasahara | 348/629 |
| 5,596,418 | 1/1997 | Strolle | 386/33 |

OTHER PUBLICATIONS

Nicholson, William Q., T. and Kenneth S. Davis, "The Binomial Window", SPIE, vol. 238, Image Processing for Missile Guidance, 1980, pp. 467–479.

*Primary Examiner*—Sherrie Hsia
*Attorney, Agent, or Firm*—Julie L. Reed; James C. Kesterson; Richard L. Donaldson

[57] ABSTRACT

A method for processing video data for increased sharpness. The data undergoes a process by which it is filtered in two dimensions. Using separable, one-dimensional filters, the process cores the data to prevent noise enhancement and applies gain to the resulting data. Finally, both dimensional filtered components are then combined to form the final sharpened image. Because of the separable nature of the process and filters, either one of the dimensional filters could be eliminated, while retaining the robustness of the method.

13 Claims, 4 Drawing Sheets

METHOD OF INCREASE SHARPNESS IN DIGITAL DISPLAYS

BACKGROUND OF THE INVENTION

1. Field of the Invention

This invention relates to display systems, more particularly to display systems using processed data, such as data resulting from progressive scan (proscan) or scaling functions.

2. Background of the Invention

A block diagram view of a typical spatial light modulator based display system is shown in FIG. 1. However, the same problems faced by SLM-based displays may arise in any system using digital processing of data. A video input is received at the signal interface (I/F) 11. If the signal is not already digital, it is digitized by analog-to-digital (A/D) conversion. The digital signal is then sent to processor 12, where it undergoes several possible processing steps, depending upon the type and architecture of the system. Possibilities include, but are not limited to: interlace to progressive scan (proscan) conversion (for interlaced signals); scaling; motion and edge detection interpolation; and color space conversion.

Some of these functions involve the application of low pass interpolation filters, such as proscan and scaling. This results in a loss of detail in the image. Therefore, at some point in the processing of the data, sharpness control is added to the input data.

An example of a typical, current embodiment of sharpness control is shown in FIG. 2. The input image undergoes horizontal and vertical filter by filters 24 an 26, respectively. Gain is then added to the image at 28, and the filtered image with gain is then added back into the original image at 30. The results in an emphasis on the higher frequency edges in the image, with only higher frequency information being passed as an enhancement signal in both dimensions. This means that only point like objects and diagonal lines will be enhanced. While the original image will have some sharpness increase, it is not nearly as sharp as desired.

Therefore, a need exists for two-dimensional filtering that passes an enhancement signal that includes both low and high frequency edges for increased sharpness.

SUMMARY OF THE INVENTION

It is an aspect of the invention to perform two-dimensional filtering upon video data to increase the sharpness perceived in the final image. In one embodiment of the invention, the data undergoes vertical filtering and gain is added to the vertically filtered data. This data is then recombined with the original image. The result of this recombination is then horizontally filtered and gain is added to it. This component is then recombined with the result of the first recombination to form the sharpened image.

It is an advantage of the invention that it increases sharpness in low frequency edges as well as high frequency edges.

It is a further advantage of the invention in that it allows the implementation of each dimensional filter to be separate from the other dimensional filter.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

The advent of spatial light modulators in display systems, and the move toward digital displays, have resulted in several adaptations to the standardized methods of data transmission used previously. For example, in typical broadcast signal display systems, using NTSC television signals, the data is interlaced when displayed. A video frame of data is divided into two fields, one with the odd-numbered lines of the field, the other with the even-numbered lines. This method came about because of the operation of the cathode ray tube (CRT), which makes two scans across a display screen per frame.

Spatial light modulators, on the other hand, usually cannot use interlaced fields in the same manner. They typically load an entire frame onto the addressing circuitry for the modulator array and display the entire frame of data. This brought about the need for interlace-to-progressive-scan (proscan) conversion. Proscan conversion results in a lessening of the sharpness of an image.

Another process that results in decreased sharpness is scaling. Scaling is performed on images of one format to enlarge or shrink the image to fit another format. For example, standard 4:3 aspect ratio Letterbox NTSC must be scaled horizontally and vertically in order to fit on a 16:9 aspect ratio display. The incoming data must be scaled for that data to be displayed in the other format. This processing of data results in decreased sharpness.

While spatial light modulator-based displays show these problems, these same decreases in sharpness will occur in any digital television system. The present invention is in no way limited to spatial light modulator systems. Similarly, the functions of scaling and proscan serve merely as examples of processes that decrease sharpness. They cause this decrease because they are typically lowpass interpolation filter functions.

Figure 1:
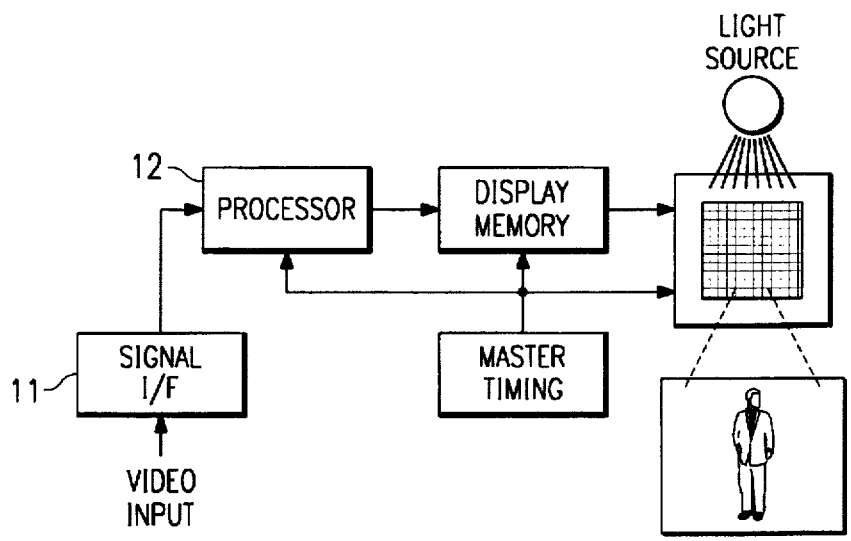
FIG. 1 shows a block diagram of a typical spatial light modulator-based display system.
Figure 2:
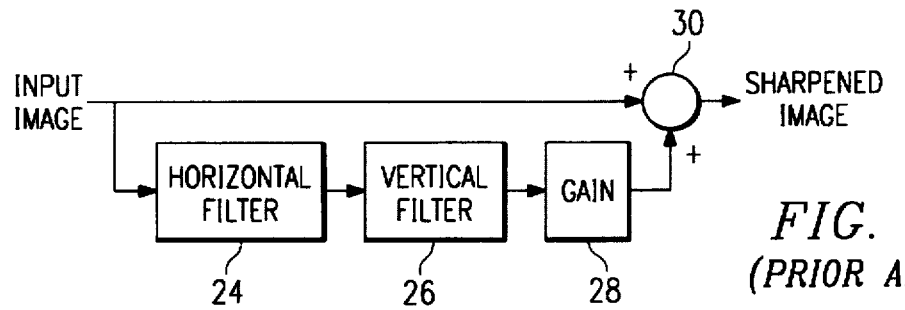
FIG. 2 shows a block diagram of a previous two-dimensional filter.

An example of a prior art system that increases sharpness is shown in FIG. 2. The incoming data is horizontally filtered and then vertically filtered at 24 and 26, respectively. One problem with such an approach is that only objects that have both a horizontal and a vertical edge component will be acted upon by the process. Examples of these include diagonals and point objects. However, the filtering process does increase sharpness for data of those objects to which it does apply.

The filtered image is then multiplied by a scaling factor which increases or decreases the magnitude of the filtered image, and the filtered image is recombined with the original image. The multiplied scaling factor is what is referred to as "gain," and that process as "applying gain." The filtered image is also referred to as the "sharpness component." The current implementation adds gain after the image data has undergone these lowpass or bandpass filter functions, resulting in an image that only enhances the high frequency edges.

Figure 3:
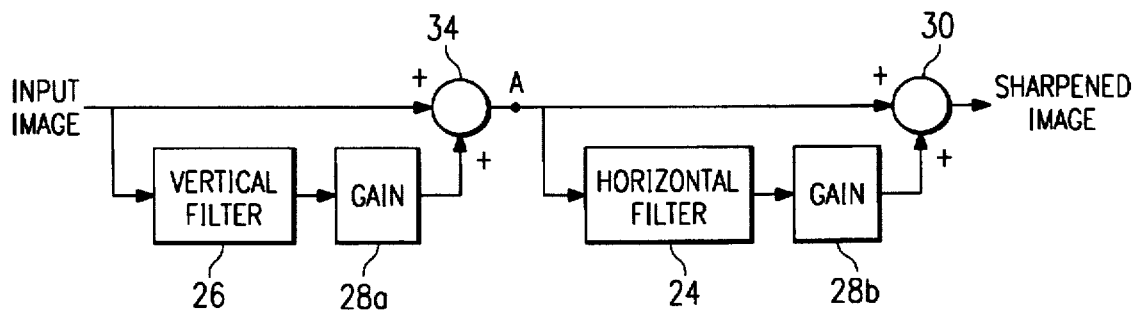
FIG. 3 shows an overall block diagram view of a separable two-dimensional filter system.

A general overview block diagram is shown in FIG. 3. The input image is received by the filter along two paths. The first path passes the original input image to the adder 34. The second path passes the original input image to a vertical filter 26. The original input image is filtered, resulting in a vertically filtered image to which gain is applied at 28a (by multiplying a scaling factor). This vertically filtered image with gain is then recombined with the original input image at 34. At point A, the system response is:

$$SI = I + g_v V(I),$$

where SI is the sharpened image, I is the original input image, $g_v$ is the vertical gain factor and V( ) is the vertical filter of whatever quantity is in the parentheses, such as I, in this example.

This vertically filtered image with gain is then horizontally filtered at 24 and has gain added to it at 28b. The image data has now been filtered in two dimensions and has added gain. For the purposes of this discussion, this will be referred to as a two-dimensional filtered image with gain. This two-dimensional filtered image with gain is then added to the system response at point A, at 30, resulting in a system response of:

$$SI = I + g_v V(I) + g_h [H(I + g_v V(I))],$$

where $g_h$ is the horizontal gain component, and H( ) is the horizontal filter of whatever quantity is within the parentheses.

This implementation of a two-dimensional filter will pass energy where the low frequency in one dimension and high frequency in the other. This will highlight edges of objects, not just point objects and diagonals, leading to a sharper picture.

Figure 4A:
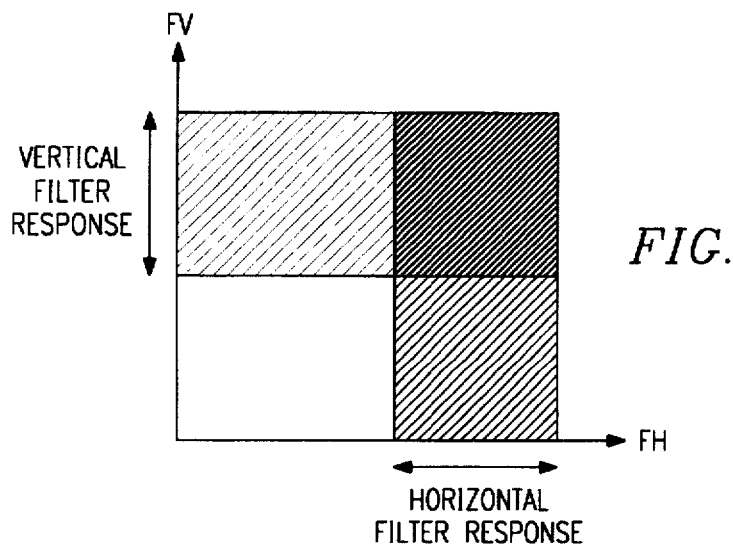
FIGS. 4a–4c show a graphical representation of filter responses for several types of dimensional filters.
Figure 4B:
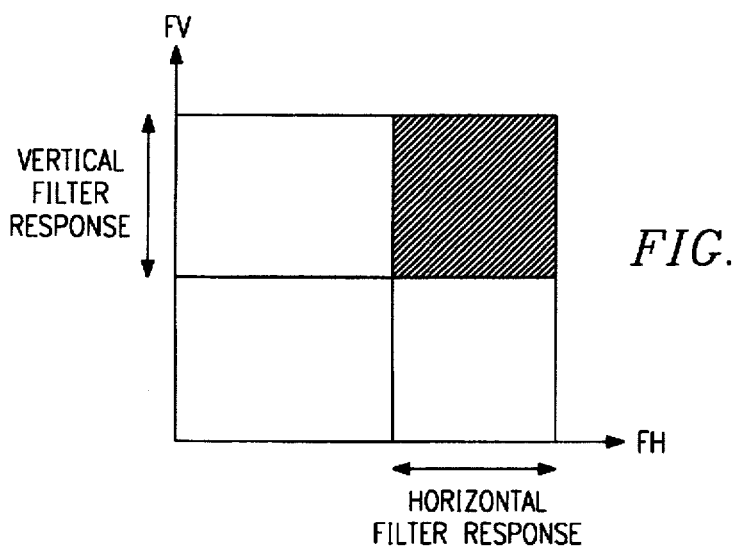
Figure 4C:
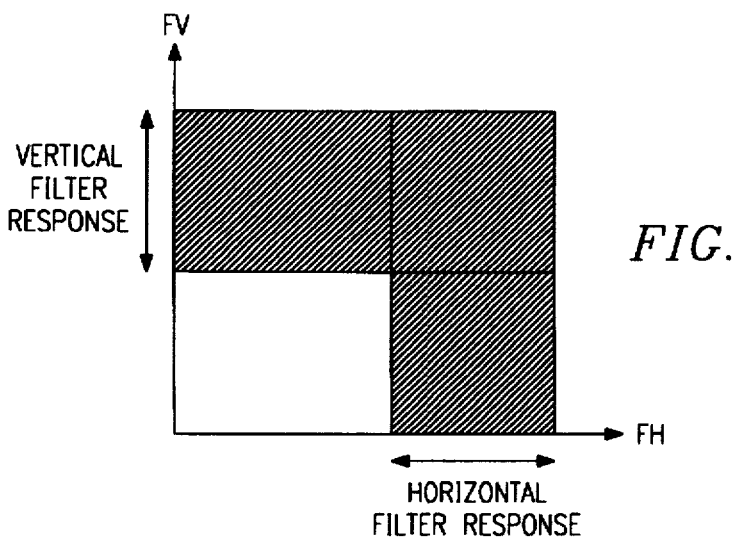

A comparison between this type of two-dimensional filter and the previously discussed filter, (as shown in FIG. 2), is shown in FIGS. 4a–4c. FIG. 4a shows the filter response of a system that uses a separable two-dimensional filtering system. The dark region where the response of the two separate filters overlaps demonstrates that the filter passes more information about objects that have edges with both a horizontal and a vertical component. The lighter regions show that where there are only vertical components to edges, the horizontal filter passes information, and where there are only horizontal edges, the vertical filter passes information.

This can be contrasted with the response of the previous systems, such as the one shown in FIG. 2. FIG. 4b shows the system response using this type of system. The darkened region of the graph shows that the system passes information about the edges only when the edges have both a vertical and a horizontal component, such as diagonals or point objects.

Finally, a filter that performs vertical and horizontal filtering in one filter has a response as shown in FIG. 4c. This appears to be an ideal solution to the problem. However, the combination of vertical and horizontal filtering requires extra hardware or more processing capability and can raise the system cost. Because of this, the filter is not robust in that it cannot be used in lower-end systems, leaving that system with either no sharpness control, or an implementation such as is shown in FIG. 2.

Figure 5A:
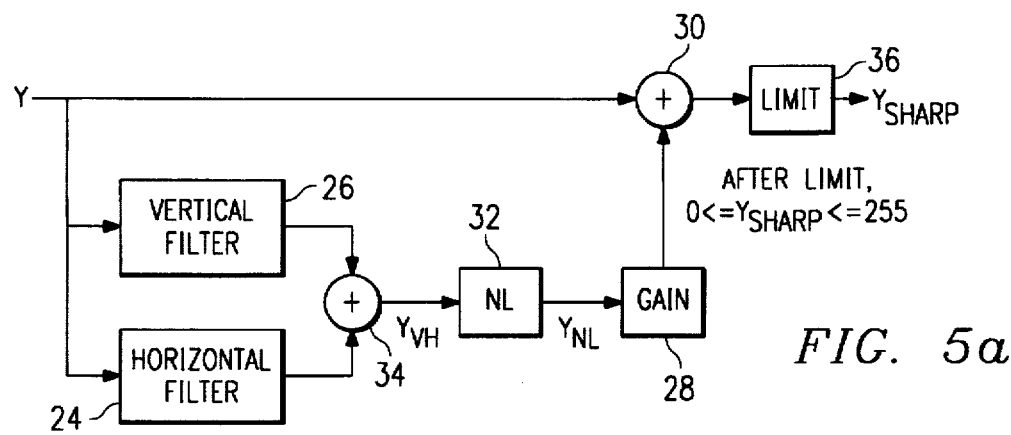
FIGS. 5a and 5c show alternate embodiments of a separable two-dimensional filter.
Figure 5B:
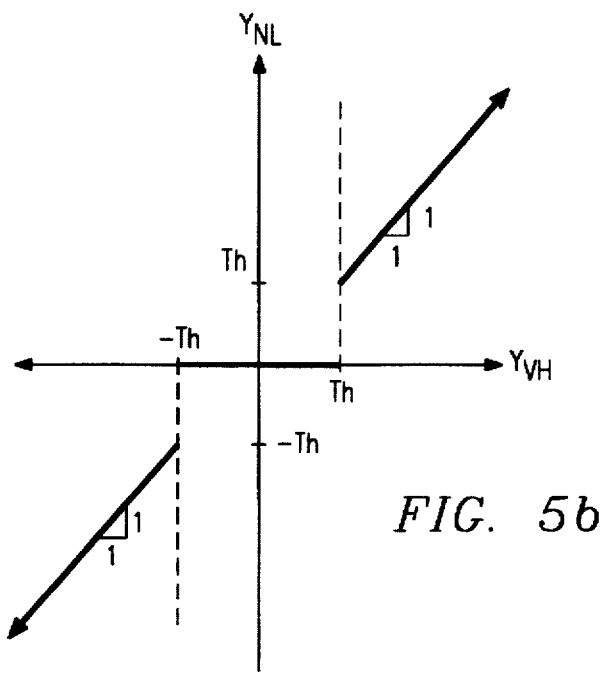
FIG. 5b shows a graph of a digital coring function applied in a filtering process.
Figure 5C:
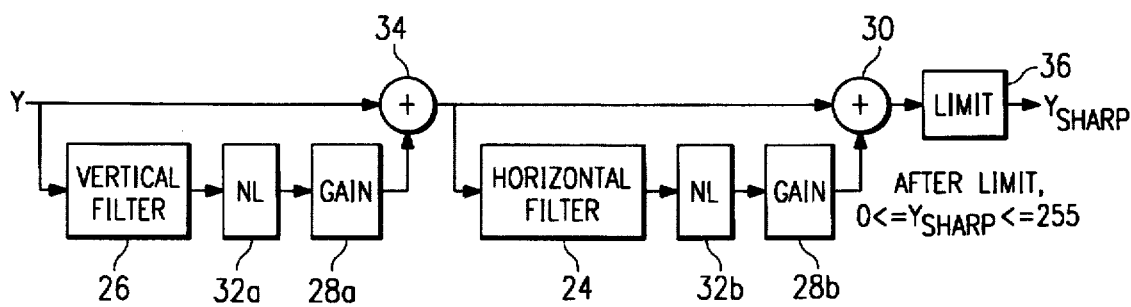

Specific embodiments of the present invention are shown in FIGS. 5a and 5c. In FIG. 5a, the same system input is used. However, as will become apparent in further discussion, the incoming data must be digital. The data passes through parallel filtering paths. One path brings the data through a vertical filter, the other through a horizontal filter. The resulting filtered data is then recombined at 34. At 32 "NL" a non-linear coring function is applied to the data.

As is shown by FIG. 5b, only data on either side of a threshold region is used. This coring function serves to eliminate noise in the data. The coring function brings data that is under the threshold to zero, eliminating noise data. Noise data typically will not reach a magnitude that is over the digital threshold. The nature of the coring function requires a digital processing solution.

After the data is "cored," gain is applied. Having to apply gain only once lowers system cost. As mentioned previously, the function of applying gain requires the use a multiplier, which is expensive. Another option for adding gain is discussed with reference to FIG. 5c.

Similarly, an alternate embodiment of the filtering process is shown in FIG. 5c. In this case, the embodiment is similar to that shown in FIG. 3. In addition to the separate horizontal and vertical filters, 24 and 26 respectively, the non-linear coring function "NL" is applied in each separate path at 32a and 32b. Additionally, the gain function is added in the separate paths at 28a and 28b. The original image data is recombined with the vertically filtered data at 34. This resulting data is then recombined with horizontally filtered data at 30.

One advantage of the system is the separability of the functions of the filters. The vertical filter could be implemented in hardware, software, or a combination of both. Similarly the horizontal filter could be implemented in hardware, software or a combination of both. However, whichever choice is made by the system designer regarding filter implementation, its specific implementation has no effect on the choices available for the other. This allows the filtering process to be very robust.

For example, suppose the decision were made to implement the vertical filter in software and the horizontal filter in hardware. Vertical filtering, regardless of its implementation, typically requires more hardware or processing capability than horizontal filtering and therefore has a greater impact upon system cost. For high end systems, both the vertical and horizontal filtering would be used as shown in FIGS. 5a and 5c. However, for lower priced systems, only the horizontal filter would be used, thus eliminating the cost associated with the more costly vertical filtering operation.

This allows the same filter implementation to be used in several systems. While the example above shows the vertical filter in software and the horizontal in hardware, the same process could be applied to a converse or other arrangement. This filtering process is completely separable.

In both FIGS. 5a and 5c, after the data is recombined, a limiting function 36 is applied to the data. The limiting function ensures that the resulting sharpness data $Y_{SHARP}$ remains between 0 and 255 bits of data. For $Y_{SHARP}$ data greater than 255, the $Y_{SHARP}$ data is set to 255. Similarly, for $Y_{SHARP}$ data less than 0, the $Y_{SHARP}$ data is set to 0.

The selection of the actual filters used in these separate filtering paths must take into consideration the robustness of the system, in addition to the robustness of the filtering component. Digital displays typically must sample the data initially to digitize it, since most broadcast video signals are analog. Depending upon system design and performance features built into the system, one system may resample the data at a different rate than another.

Figure 6:
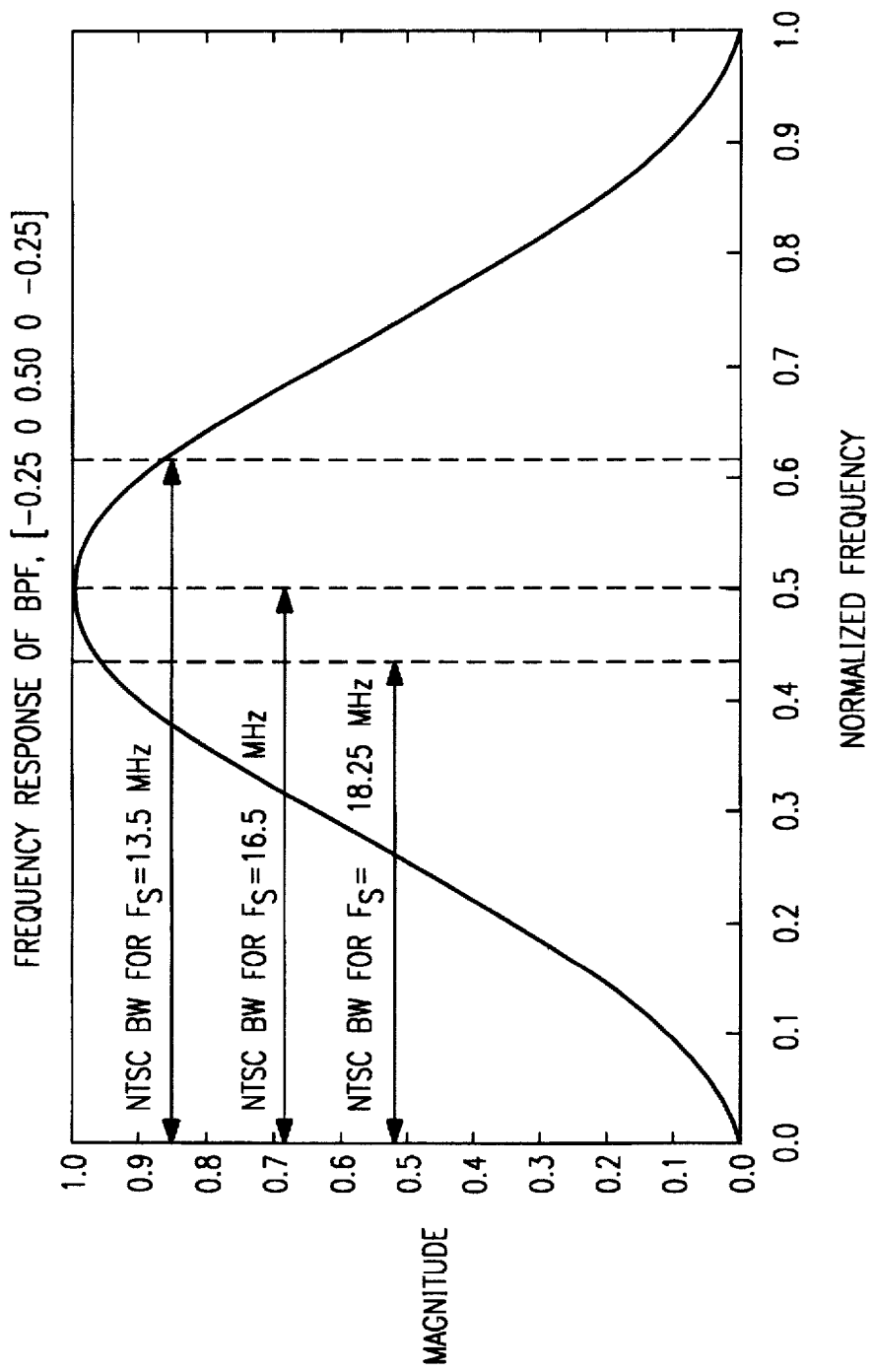
FIG. 6 shows a graphical representation of a frequency response of a robust bandpass filter for use with several alternative schemes for data sampling rates.

It is possible to use a filtering system within the display system that is flexible enough to be used regardless of the system sampling rate. A bandpass filter, such as one shown in FIG. 6, can be used to provide a robust digital sharpness design. The filter response is plotted in FIG. 6 verses normalize frequency, where a normalized frequency of 1 corresponds to a frequency of $f_s/2$, where $f_s$ is the sampling frequency. A typical NTSC signal has a bandwidth of approximately 4.2 MHz. Different display designs or options may require different sample rates. Shown in FIG. 6 are three typical NTSC sampling rates, 13.5 MHz, 16.5 MHz, and 18.25 MHz. The bandwidths of these NTSC sampling rates are located close to the peak response of this bandpass digital filter.

Therefore, it is possible to further supplement the robustness of the separable filtering system by selecting a bandpass filter with a frequency response centered at a normalized frequency of 0.5. This increases the already robust nature of the filtering process discussed above. This filtering process allows the designers to use one solution for sharpness control in several systems and at several sampling rates.

Thus, although there has been described to this point particular embodiments of a method to sharpen a displayed image, it is not intended that such specific references be considered as limitations upon the scope of this invention except in-so-far as set forth in the following claims.

What is claimed is:

1. A digital display system comprising:
   an input signal which provides image data to said system;
   a video processor operable to perform interlace to progressive scan conversion upon said image data;
   a sharpness filter operable to increase image resolution after said processor has operated upon said data, wherein said sharpness filter has both a horizontal filtering component and a vertical filtering component capable of being implemented independent of one another.

2. The system as claimed in claim 1 wherein said horizontal and vertical filtering components are implemented in parallel paths.

3. The system as claimed in claim 1 wherein said horizontal and vertical filtering components are implemented in a serial fashion.

4. The system as claimed in claim 1 wherein only said horizontal filtering component is implemented.

5. The system as claimed in claim 1 wherein said horizontal and vertical filtering components use bandpass filters.

6. A method of separably filtering digital image data, comprising the steps of:
   filtering said data, wherein said filtering step includes at least one of the following steps, said steps being independent of one another;
   horizontally filtering said data to increase horizontal detail;
   vertically filtering said data for increasing vertical detail;
   coring said data to prevent noise enhancement; and
   applying gain to said data.

7. The method of claim 6 wherein only said horizontally filtering step is performed.

8. The method of claim 6 wherein said horizontally filtering and said vertically filtering steps are performed in parallel to said data.

9. The method of claim 8 wherein said coring step occurs after said data from said parallel filtering steps is recombined.

10. The method of claim 8 wherein said applying gain is performed after said data from said parallel filtering steps is recombined.

11. The method of claim 6 wherein said horizontally filtering and said vertically filtering steps are performed in series to said data.

12. The method of claim 11 wherein both filtering steps are used and said coring step is performed after each said filtering step.

13. The method of claim 11 wherein said applying step occurs after said coring step.

* * * * *